United States Patent [19]
Kim

[11] Patent Number: 5,947,608
[45] Date of Patent: Sep. 7, 1999

[54] CONICAL BEARING APPARATUS USED IN A MOTOR

[75] Inventor: Seung-gon Kim, Seoul, Rep. of Korea

[73] Assignee: Samsung Electronics Co., Ltd., Kyungki-do, Rep. of Korea

[21] Appl. No.: 09/012,002

[22] Filed: Jan. 22, 1998

[30] Foreign Application Priority Data

Jan. 22, 1997 [KR] Rep. of Korea ......................... 97-1695

[51] Int. Cl.$^6$ .................................................. F16C 17/10
[52] U.S. Cl. ............................................................. 384/110
[58] Field of Search ................................... 384/110, 108, 384/109, 115, 246

[56] References Cited

U.S. PATENT DOCUMENTS 4,710,034  12/1987  Tittizer et al. ........................... 384/110

*Primary Examiner*—Lenard A. Footland
*Attorney, Agent, or Firm*—Sughrue, Mion, Zinn, Macpeak & Seas, PLLC

[57] ABSTRACT

A conical bearing apparatus is provided which is capable of enhancing productivity by reducing the time required for processing a hemispheric bearing i.e., grinding and lapping. By locating a spacer between a pair of cones, the cones are arranged on a fixing shaft facing each other and then inserted into a bush in which a pair of conical concaves for receiving the cones are formed. The thrust load and the radial load are supported by the dynamic pressure formed between the conical concaves and the dynamic pressure generating grooves formed on the tapered surfaces of the cones. Accordingly, as the bearing is conical shape, it is unnecessary to lap the hemispheric surface for minute clearance between the hemisphere and the hemispheric concave, thereby resulting in easy processing and enhancing the productivity of the bearing.

3 Claims, 3 Drawing Sheets

CONICAL BEARING APPARATUS USED IN A MOTOR

BACKGROUND OF THE INVENTION

1. Field of the Invention

The present invention relates to a conical bearing apparatus used in a motor, and more particularly to a conical bearing apparatus capable of enhancing productivity by removing grinding and lapping steps and reducing the time required in grinding and lapping.

2. Description of the Related Art

Recently, with the improvement of technologies in the information and media industries, such as computer systems, audio systems and video systems, driving motors for various kinds of devices, such as a head driving apparatus of a video tape recorder, an optical polygon driving apparatus of a laser printer, or a camcorder driving motor, need to have a high density and more compact size. In this respect, components of such systems require a more precise performance. Those driving apparatuses require a bearing which is precise and stable, and has a superhigh rotation performance. In compliance with such a need, a hemispheric bearing apparatus, i.e., a dynamic pressure fluid bearing apparatus has been developed which supports both the radial load and thrust load and is suitable to perform the desired superhigh speed rotation.

FIG. 1 is a sectional view of an optical polygon driving apparatus of a laser printer employing a conventional hemispheric bearing. Referring to FIG. 1, the optical polygon driving apparatus includes: an optical polygon 10 for deflecting a laser beam to a photoconductive drum (not illustrated); hemispheric bearing apparatuses 20, 30, 35 and 40 for rotating the optical polygon 10 at a superhigh speed with a minimum friction; rotary power generating apparatuses 50 and 55 which are connected to the hemispheric apparatus and for generating the rotary power; and a lower housing 70 and an upper housing 75 for receiving the above-identified components.

A through hole having a predetermined diameter is formed at the optical polygon 10. To the through hole of the optical polygon 10, a hub 60 is connected. The hub 60 has a shape in which two cylinders 60a and 60b having different diameters are connected. The through hole of the optical polygon 10 is inserted to the cylinder 60a having a smaller diameter. At the cylinder 60b having a larger diameter, a groove 60c having a predetermined diameter and depth is formed.

After the optical polygon 10 is inserted into the cylinder 60a having a smaller diameter, it is located at a projection which is formed at a position where the cylinder 60a having a smaller diameter and the cylinder 60b having a larger diameter are connected, thereby completely contacted by a plate spring 65.

At the hub 60, a bush 40 which has a predetermined height and has a cylindrical shape whose inside is filled is connected. As the diameter of the bush 40 is slightly larger than the groove 60c of the hub 60, it is tightly fitted to the groove 60c. Moreover, at both ends of the bush, a through hole having a predetermined diameter is formed, respectively. The diameter of the through hole is slightly larger than that of a shaft 20 which is fixed at the lower housing.

As shown above, through holes which penetrate each center of both ends of the bush 40 are formed. At the both ends of the bush 40, two hemispheres are located, with their hemispheric surfaces facing each other, and there are hemispheric concaves 30a and 30b each having the same shape as hemispheres 30 and 35 each having a dynamic pressure generating groove (not illustrated) of a spiral shape.

As the shapes of the hemispheric concaves 30a and 30b formed at the bush 40 and the hemispheres 30 and 35 indented on the shaft 20 are the same, in the case that the hemispheres 30 and 35 are fitted to the hemispheric concaves 30a and 30b of the bush 40 closely, a clearance for forming a fluid pressure is not formed between the bush 40 and the hemispheres 30 and 35, and thereby it is impossible to perform the function of the fluid bearing. Accordingly, as it is necessary to have a proper clearance between the bush 40 and the hemispheres 30 and 35, a ring-shaped spacer 40a having a precise height and a predetermined inner and outer diameters are formed at the through hole of the bush 40 so as to have a predetermined clearance between the hemispheres 30 and 35 and the hemispheric concaves 30a and 30b.

At this time, the lower hemisphere 30 and the lower hemispheric concave 30a are completely contacted due to the influence of the gravity. Between the upper hemisphere 35 and the upper hemispheric concave 30b, a clearance is formed.

At the outer surface of the bush 40, a rotor 50 is formed. A stator 55 is located at a predetermined position of the lower housing 70, apart from the rotor 50.

The hemispheres 30a and 30b are processed to have a high sphericity of 0.05 $\mu$m, and they are grinded and lapped to have a smooth surface.

The operation of the hemispheric bearing used in a laser scanning motor will be explained, with reference to the drawings.

First, when the power is applied to the stator 55 and then the rotor 50 and the bush start to rotate, the lower hemispheric concave 30a of the bush 40 is lowered in the direction of the gravity by the load of the bush 40, and thereby it is contacted to the lower hemisphere 30 without any clearance.

As shown above, as the lower hemisphere 30 is contacted to the lower hemispheric concave 30a and the upper hemisphere 35 is apart from the upper hemispheric concave 30b, when the bush 40 rotate, the clearance between the upper hemispheric concave 30b and the upper hemisphere 35 is larger than the clearance between the lower hemisphere 30 and the lower hemispheric concave 30a. As a result, as the dynamic pressure becomes larger in the lower hemisphere 30 and the lower hemispheric concave 30a, the lower hemispheric concave 30a is raised from the lower hemisphere 30 by the generated dynamic pressure.

However, as the bush 40 is raised from the lower hemisphere 30, the clearance between the lower hemisphere 30 and the lower hemispheric concave 30a becomes larger, and the clearance between the upper hemisphere 35 and the upper hemispheric concave 30b becomes smaller. As a result, the dynamic pressure formed by the upper hemisphere 35 and the upper hemispheric concave 30b tends to increase.

The bush 40 which is formed between a pair of hemispheres varies the clearance, and it is rotated in an equilibrium state in the clearance where the difference of the dynamic pressure generated in the lower hemisphere and the upper hemisphere coincides with the weight of the rotary body.

However, since the hemispheric bearing must be precisely processed, the lapping process should be performed by a separate lapping machine to achieve the smooth surface. This requires increased time to manufacture the hemisphere, thereby preventing efficient mass production.

SUMMARY OF THE INVENTION

Therefore, it is an object of the present invention to provide a bearing apparatus which supports both a radial load and a thrust load, and a conical bearing apparatus having a high productivity which are easily manufactured.

According to the present invention, a conical bearing apparatus includes: a fixing shaft which is fixed at a lower housing; a pair of cones wherein a circular end having a first diameter is formed at its one end and a circular end having a second diameter larger than the first diameter is formed at the other end, and having a tapered surface with a predetermined slope at its side; and a bush wherein a through hole to which the fixing shaft is penetrated is formed, and conical concaves for receiving a pair of cones is located at both ends of the through hole facing each other. A pair of the cones are fixed so that the circular ends of the first diameter can face each other by locating a spacer therebetween.

Preferably, on the tapered surface of the cone, a spiral shaped dynamic pressure generating groove is formed, and the conical concaves are formed larger than the cones. Moreover, the clearance between the conical concaves and the cones are controlled by the spacer.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferable embodiments referring to the attached drawings.

Figure 1:
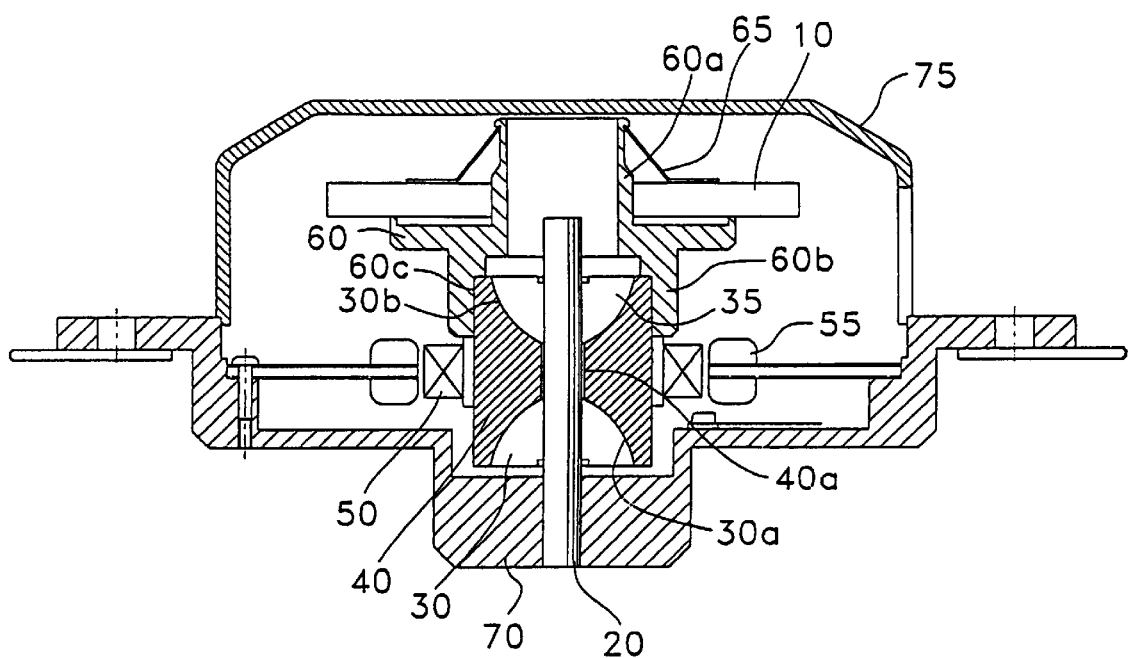
FIG. 1 is a sectional view illustrating a laser scanning motor employing a hemispheric bearing apparatus.
Figure 2:
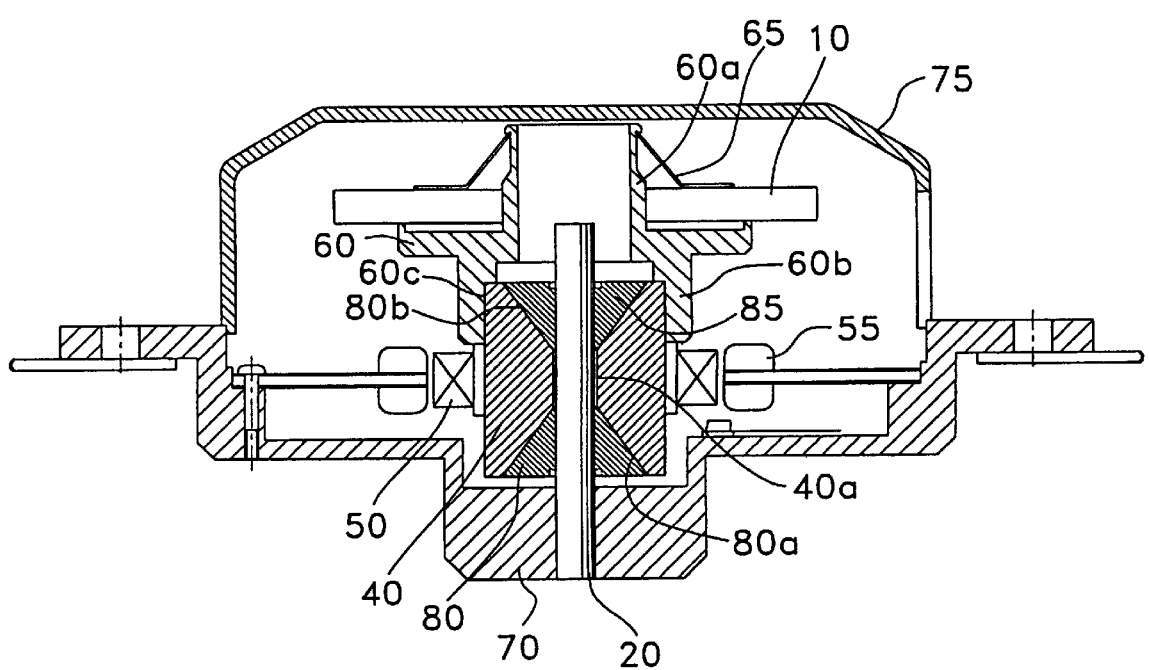
FIG. 2 is a sectional view illustrating a laser scanning motor employing a conical bearing apparatus according to the present invention.
Figure 3:
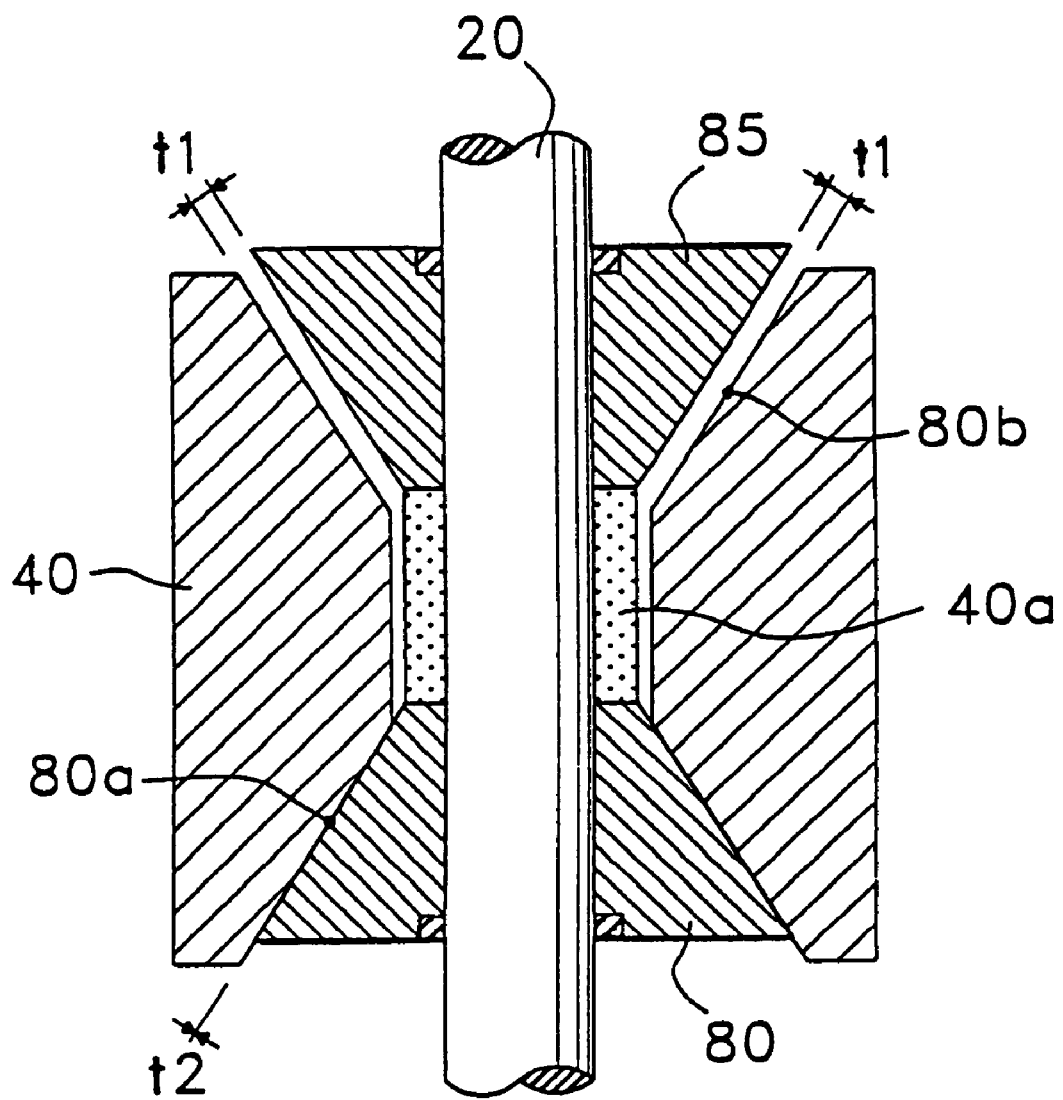
FIG. 3 is a sectional view enlarging a bearing apparatus of FIG. 2.

Referring to FIG. 2 and FIG. 3, an optical polygon driving apparatus of a laser printer employing a conical bearing apparatus according to the present invention will be explained.

First, as shown in FIG. 2, a fixing shaft 20 on which a pair of cones 80 and 85 are arranged is indented in a lower housing 70. At the outer surface of the bush 40, an optical polygon 10 and a rotor 50 are located. As a result, the cones 80 and 85 and the fixing shaft 20 are fixed, and the bush 40 is located to be rotated regarding the fixing shaft 20. The rotor 50 is located at the bush 40, and a stator 55 is formed apart from the rotor 50 and it is fixed at the lower housing 70.

Referring to FIG. 3, the conical bearing apparatus according to the present invention includes: a fixing shaft 20 which is fixed at the lower housing 70; a pair of cones 80 and 85 wherein a circular end having a first diameter is formed at its one end and a circular end having a second diameter larger than the first diameter is formed at the other end, and having a tapered surface with a predetermined slope at its side; and the bush 40 wherein a through hole to which the fixing shaft 20 is penetrated is formed, and conical concaves 80a and 80b for receiving a pair of cones 80 and 85 are located at both ends of the through hole facing each other.

The cones 80 and 85 are fixed at the fixing shaft 20 to face each other. At the tapered surface of the cones 80 and 85, a dynamic pressure generating groove of the spiral shape is formed.

Here, the bush 40 supports the radial load and the thrust load of the cones 80 and 85. At the inside of the bush 40, a through hole having larger diameter than the fixing shaft 20 is formed in the longitudinal direction. At both ends of the through hole, the conical concaves 80a and 80b for receiving the cones 80 and 85 are formed. Preferably, the conical concaves 80a and 80b are formed slightly larger than the cones 80 and 85. In other words, as the conical concaves 80a and 80b have the same shapes as the cones 80 and 85 and their sizes are slightly larger than the cones 80 and 85, clearances t1 is formed between the cone 80 and the conical concave 80a and clearance t2 is formed between the cone 85 and the conical concave 80b. At this time, the clearance t2 becomes zero due to the load of the bush 40 and the weight of the optical polygon and the driving motor.

Moreover, a spacer 40a which is indented in the fixing shaft 20 is inserted into the through hole of the bush 40, and controls the clearance between the cones 80 and 85 and the conical concaves 80a and 80b.

As the tapered surfaces of the cones 80 and 85 are formed with cylindrical materials by the turning operations, they are easily processed. For surface treatment of the cones 80 and 85 after the turning operations, the cones 80 and 85 are processed through grinding.

The operation of the conical bearing used in the motor according to the present invention having the above-identified structure will be illustrated, with reference to the drawings.

First, when the power is applied to the stator 55 and the rotor 50, the bush 40 starts to rotate. The conical concave 80a of the bush 40 lowers in the direction of gravity due to the load of the bush 40, thereby the conical concave 80a closely contacts the cone 80 without any clearance.

When the lower cone 80 and the lower conical concave 80a are closely contacted and the upper cone 85 and the upper conical concave 80b have a clearance therebetween, as the bush 40 rotates, the bush 40 is raised. Since the clearance t1 between the upper cone 85 and the upper conical concave 80b is larger than the clearance t2 between the lower cone 80 and the lower conical concave 80a, the lower cone 80 pushes off from the lower conical concave 80a, and thereby the bush 40 is raised.

Over time, the clearance between the lower cone 80 and the lower conical concave 80a of the bush 40 gradually becomes larger and the clearance between the upper cone 85 and the upper conical concave 80b gradually becomes smaller. As a result, after a predetermined time elapses, the cone 80 and the conical concave 80a, and the cone 85 and the conical concave 80b, are in a state of equilibrium, and thereby the cones 80 and 85 and conical concaves 80a and 80b are rotated without contacting each other.

As described above, by locating the spacer between a pair of cones, the cones are arranged on the fixing shaft facing each other and then inserted into the bush in which a pair of conical concaves for receiving the cones are formed. The thrust load and the radial load can be supported by the dynamic pressure formed between the conical concaves and the dynamic pressure generating grooves formed on the tapered surfaces of the cones. Accordingly, since the bearing has a conical shape, it is unnecessary to lap the hemispheric surface for minute clearance between the hemisphere and the hemispheric concave, thereby requiring easy processing and enhancing the productivity of the bearing.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A conical bearing apparatus for use in an electric motor, comprising:

a fixing shaft fixed at a lower housing:

a pair of cones each having a circular end having a first diameter formed at one end and a circular end having a second diameter larger than said first diameter formed at the other end, and having a tapered surface with a predetermined slope, in which through holes respectively extend from the one end to the other end, the pair of the cones being mounted on the shaft so as to face each other at the circular end having the first diameter, the tapered surface having a dynamic pressure generating means formed thereon;

a bushing having conical grooves to receive the pair of cones fixed to the shaft and having respective gaps between pairs of the conical grooves and cones, a width of each of the gaps being equalized to one other by a dynamic pressure generated by the dynamic pressure generating means as the bushing rises to be spaced substantially equally from each of the cones, the bushing being rotated by the motor; and a spacer located between the pairs of cones so as to be between each of the circular ends having the first diameter.

2. The conical bearing apparatus for use in an electric motor according to claim 1, wherein the dynamic pressure generating means is a spiral shaped dynamic pressure generating groove.

3. The conical bearing apparatus for use in an electric motor according to claim 1, wherein the gaps between the cones and the conical grooves are adjusted by the spacer.

* * * * *